US012562982B2

(12) United States Patent
Boutros et al.

(10) Patent No.: US 12,562,982 B2
(45) Date of Patent: Feb. 24, 2026

(54) SIMPLE FAST CONVERGENCE USING STATIC PSEUDOWIRE IN A DUAL HOMING CONFIGURATION

(71) Applicant: Ciena Corporation, Hanover, MD (US)

(72) Inventors: Sami Boutros, Union City, CA (US); Muthurajah Sivabalan, Kanata (CA); David Gilson, Honolulu, HI (US); Mohammad Furqanul Haq, Ottawa (CA); Ozgur Bulbul, Blacksburg, VA (US)

(73) Assignee: Ciena Corporation, Hanover, MD (US)

( * ) Notice: Subject to any disclaimer, the term of this patent is extended or adjusted under 35 U.S.C. 154(b) by 4 days.

(21) Appl. No.: 18/408,224

(22) Filed: Jan. 9, 2024

(65) Prior Publication Data

US 2025/0007824 A1     Jan. 2, 2025

Related U.S. Application Data

(60) Provisional application No. 63/510,605, filed on Jun. 27, 2023.

(51) Int. Cl.
H04L 45/00 (2022.01)
H04L 45/28 (2022.01)
H04L 45/74 (2022.01)

(52) U.S. Cl.
CPC .............. H04L 45/38 (2013.01); H04L 45/28 (2013.01); H04L 45/74 (2013.01)

(58) Field of Classification Search
CPC . H04L 12/4641; H04L 45/02; H04L 12/4633; H04L 45/64; H04L 45/28;
(Continued)

(56) References Cited

U.S. PATENT DOCUMENTS 9,154,411 B2 * 10/2015 Martini .................. H04L 45/50
9,538,423 B2    1/2017 Alvarez et al.
(Continued)

FOREIGN PATENT DOCUMENTS

CN        111917461 B   * 12/2021   .......... H04B 10/032

OTHER PUBLICATIONS

A. Sajassi et al., "BGP MPLS-Based Ethernet VPN," Internet Engineering Task Force (IETF), Category: Standards Track, ISSN: 2070-1721, Feb. 2015, pp. 1-56.
(Continued)

*Primary Examiner* — Chirag R Patel
(74) *Attorney, Agent, or Firm* — Baratta Law PLLC; Lawrence A. Baratta, Jr.

(57)        ABSTRACT

A Provider Edge (PE) router includes a plurality of ports configured to connect to one or more Customer Edge (CE) devices, wherein the plurality of ports are in an Ethernet Virtual Private Network (EVPN) with a second PE router having a second plurality of ports; a static connection configured to connect to the second plurality of ports in the second PE router; and switching circuitry connected to and configured to switch traffic between the plurality of ports, the static connection, and an Internet Protocol (IP) interface connected to an external network, wherein the EVPN is confined to dual homing and protection functionality in the dual homing is performed based on settings in the switching circuitry.

16 Claims, 12 Drawing Sheets

(58) Field of Classification Search
CPC ....... H04L 45/586; H04L 45/42; H04L 45/50; H04L 45/78
See application file for complete search history.

(56) References Cited

U.S. PATENT DOCUMENTS

| | | | |
|---|---|---|---|
| 9,749,249 B2 * | 8/2017 | Pan | H04L 47/245 |
| 9,853,833 B2 | 12/2017 | Brissette et al. | |
| 9,923,781 B2 * | 3/2018 | Chalapathy | H04L 41/08 |
| 9,979,602 B1 | 5/2018 | Chinnakannan et al. | |
| 9,979,629 B2 | 5/2018 | Sivabalan et al. | |
| 10,250,494 B2 | 4/2019 | Sivabalan et al. | |
| 10,491,483 B2 | 11/2019 | Boutros et al. | |
| 10,523,455 B2 | 12/2019 | Boutros et al. | |
| 10,659,252 B2 | 5/2020 | Boutros et al. | |
| 10,728,174 B2 | 7/2020 | Boutros et al. | |
| 10,797,910 B2 | 10/2020 | Boutros et al. | |
| 10,805,181 B2 | 10/2020 | Boutros et al. | |
| 10,958,462 B2 | 3/2021 | Boutros et al. | |
| 10,979,246 B2 | 4/2021 | Boutros et al. | |
| 10,979,352 B2 | 4/2021 | Boutros et al. | |
| 11,012,357 B2 | 5/2021 | Boutros et al. | |
| 11,128,557 B2 | 9/2021 | Dubey et al. | |
| 11,153,122 B2 | 10/2021 | Dubey et al. | |
| 11,265,246 B2 | 3/2022 | Pallagatti Kotrabasappa et al. | |
| 11,394,643 B2 | 7/2022 | Boutros et al. | |
| 11,405,352 B2 | 8/2022 | Boutros et al. | |
| 11,533,259 B2 | 12/2022 | Boutros et al. | |
| 11,552,879 B1 | 1/2023 | Sivabalan et al. | |
| 11,895,020 B1 * | 2/2024 | Arham | H04L 45/42 |
| 2011/0268130 A1 | 11/2011 | Tsier et al. | |
| 2017/0099180 A1 * | 4/2017 | Singh | H04L 12/4641 |
| 2017/0195210 A1 * | 7/2017 | Jacob | H04L 45/04 |
| 2020/0177402 A1 * | 6/2020 | Mishra | H04L 67/2895 |
| 2021/0111914 A1 | 4/2021 | Boutros et al. | |
| 2021/0352007 A1 | 11/2021 | Boutros et al. | |
| 2021/0352011 A1 * | 11/2021 | Boutros | H04L 12/44 |
| 2022/0086078 A1 | 3/2022 | Sivabalan et al. | |
| 2022/0124019 A1 | 4/2022 | Boutros et al. | |
| 2022/0131721 A1 | 4/2022 | Boutros et al. | |
| 2022/0200903 A1 | 6/2022 | Boutros et al. | |
| 2022/0272037 A1 | 8/2022 | Boutros et al. | |
| 2022/0337517 A1 | 10/2022 | Boutros et al. | |
| 2023/0071325 A1 | 3/2023 | Boutros et al. | |
| 2023/0073266 A1 | 3/2023 | Boutros et al. | |
| 2023/0146226 A1 | 5/2023 | Sivabalan et al. | |
| 2023/0146374 A1 | 5/2023 | Sivabalan et al. | |
| 2024/0171511 A1 * | 5/2024 | Ren | H04L 45/02 |
| 2024/0195648 A1 * | 6/2024 | Mishra | H04L 45/16 |

OTHER PUBLICATIONS

A. Sajassi et al., "A Network Virtualization Overlay Solution Using Ethernet VPN (EVPN)," Internet Engineering Task Force (IETF), Category: Standards Track, ISSN: 2070-1721, Mar. 2018, pp. 1-33.
A. Sajassi et al., "Requirements for Ethernet VPN (EVPN)," Internet Engineering Task Force (IETF), Category: Informational, ISSN: 2070-1721, May 2014, pp. 1-15.

* cited by examiner

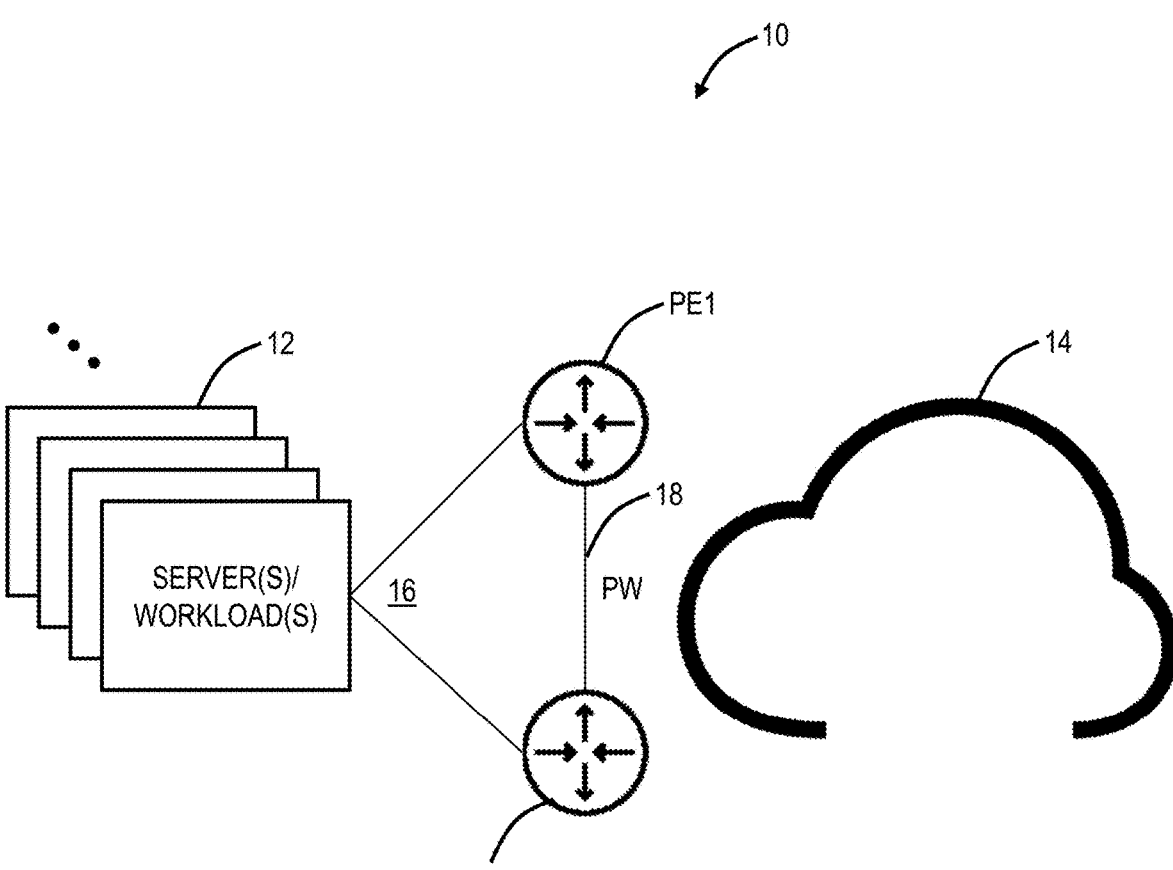
_FIG. 1_

*FIG. 5*

SIMPLE FAST CONVERGENCE USING STATIC PSEUDOWIRE IN A DUAL HOMING CONFIGURATION

CROSS-REFERENCE TO RELATED APPLICATION(S)

The present disclosure claims priority to U.S. Provisional Patent No. 63/510,605, filed Jun. 27, 2023, the contents of which are incorporated by reference in their entirety.

FIELD OF THE DISCLOSURE

The present disclosure relates generally to networking and computing. More particularly, the present disclosure relates to systems and methods for simple fast convergence using static pseudowire in a dual homing configuration.

BACKGROUND OF THE DISCLOSURE

Ethernet Virtual Private Network (VPN) (EVPN) is an approach to provide virtual multipoint bridged connectivity between different Layer 2 domains. EVPN is considered an improvement over Layer 2 Virtual Private Local Area Network (LAN) service (VPLS) with control plane Media Access Control (MAC) learning, multi-homing, load balancing, and the like. EVPN control plane MAC learning, via Border Gateway Protocol (BGP), is used to address shortcomings in VPLS. EVPN is described, e.g., in RFC 7209, "Requirements for Ethernet VPN (EVPN)," May 2014, RFC 7432, "BGP MPLS-Based Ethernet VPN," February 2015, and RFC 8365, "A Network Virtualization Overlay Solution Using Ethernet VPN (EVPN)," March 2018, the contents of each are incorporated by reference. EVPN uses Border Gateway Protocol (BGP) signaling to establish the EVPN instance (EVI) with BGP Peers to offer a multipoint-to-multipoint L2 Ethernet service for a given client. EVPN relies on learning the Internet Protocol (IP) and Media Access Control (MAC) address binding of the locally connected Customer Edges (CEs) and distributing this information in the BGP EVPN Protocol Data Units (PDUs) to remote Provider Edges (PEs) that are members of the established EVPN instance. BGP utilizes an EVPN Network Layer Reachability Information (NLRI), which includes a Route Type field that details the encoding of the EVPN NLRI. The Route Types include 1—Ethernet Auto-Discovery (A-D) route, 2—MAC/IP Advertisement route, 3—Inclusive Multicast Ethernet Tag route, and 4—Ethernet Segment route.

BRIEF SUMMARY OF THE DISCLOSURE

The present disclosure relates to systems and methods for simple fast convergence using static pseudowire in a dual homing configuration. In particular, the present disclosure limits the scope of EVPN to a dual homing configuration with a static configuration. Beneficially, this significantly reduces complexity and supports fast convergence. Additionally, the present disclosure includes an internal data center network architecture utilizing a Passive Optical Network (PON) architecture. In an embodiment, the internal data center network architecture can utilize the static pseudowire in a dual homing configuration to dual home servers, workloads, etc.

In an embodiment, a Provider Edge (PE) router includes a plurality of ports configured to connect to one or more Customer Edge (CE) devices, wherein the plurality of ports are in an Ethernet Virtual Private Network (EVPN) with a second PE router having a second plurality of ports; a static connection configured to connect to the second plurality of ports in the second PE router; and switching circuitry connected to and configured to switch traffic between the plurality of ports, the static connection, and an Internet Protocol (IP) interface, wherein the EVPN is confined to dual homing and protection functionality in the dual homing is performed based on settings in the switching circuitry. The static connection can be a pseudowire, such as, e.g., a Segment Routing over Internet Protocol version 6 pseudowire.

The settings in the switching circuitry can be settings of a protection group that are set based on a respective port status whether it is active or standby. The EVPN can utilize Integrated Routing and Bridging (IRB) and does not utilize EVPN Route Type 1 or Route Type 3 information. The protection functionality in the dual homing can be performed in a data plane. The plurality of ports can include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and to a standby port of another of the PE router and the second PE router. Traffic on the IP interface destined for an active port of the plurality of ports can be directed to the active port, and traffic on the IP interface destined for a standby port of the plurality of ports can be directed to the second PE router via the static connection. The switching circuitry can be configured to determine there is a fault, and to adjust a configuration based thereon.

In another embodiment, a method, implemented by a Provider Edge (PE) router, includes communicating to one or more Customer Edge (CE) devices via a plurality of ports in an Ethernet Virtual Private Network (EVPN) with a second PE router having a second plurality of ports; communicating with the second PE router via a static connection; and switching traffic, via switching circuitry, between the plurality of ports, the static connection, and an Internet Protocol (IP) interface, wherein the EVPN is confined to dual homing and protection functionality for the switching is performed based on settings in the switching circuitry. The static connection can be a pseudowire, such as, e.g., a Segment Routing over Internet Protocol version 6 pseudowire.

The settings in the switching circuitry can be settings of a protection group that are set based on a respective port status whether it is active or standby. The EVPN can utilize Integrated Routing and Bridging (IRB) and does not utilize EVPN Route Type 1 or Route Type 3 information. The protection functionality in the dual homing can be performed in a data plane. The plurality of ports can include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and to a standby port of another of the PE router and the second PE router. Traffic on the IP interface destined for an active port of the plurality of ports can be directed to the active port, and traffic on the IP interface destined for a standby port of the plurality of ports can be directed to the second PE router via the static connection.

In a further embodiment, a Provider Edge (PE) router includes one or more active ports configured to connect to a first set of Customer Edge (CE) devices; one or more standby ports configured to connect to a second set of CE devices, wherein the one or more active ports and the one or more standby ports are in an Ethernet Virtual Private Network (EVPN) with a second PE router having one or more second active ports and one or more second standby ports, wherein the EVPN is confined to dual homing; a first static connection between the one or more active ports and the one or more second standby ports; a second static connection between the one or more standby ports and the one or more second active ports; and switching circuitry connected to and configured to switch traffic between the one or more active ports, the one or more standby ports, the first static connection, the second static connection, and an Internet Protocol (IP) interface. The first static connection and the second static connection can each be a pseudowire. The settings in the switching circuitry can be settings of a protection group that are set based on port status whether it is active or standby.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a network illustrating servers, workloads, tenant Virtual Machines (VMs), collectively CE devices, each dual homed to two PE routers PE1, PE2 that connect to a network, i.e., the cloud, Internet, etc.

FIG. 5 is a network diagram of the network illustrating intra subnet traffic switched at Layer 2.

DETAILED DESCRIPTION OF THE DISCLOSURE

Figure 2:
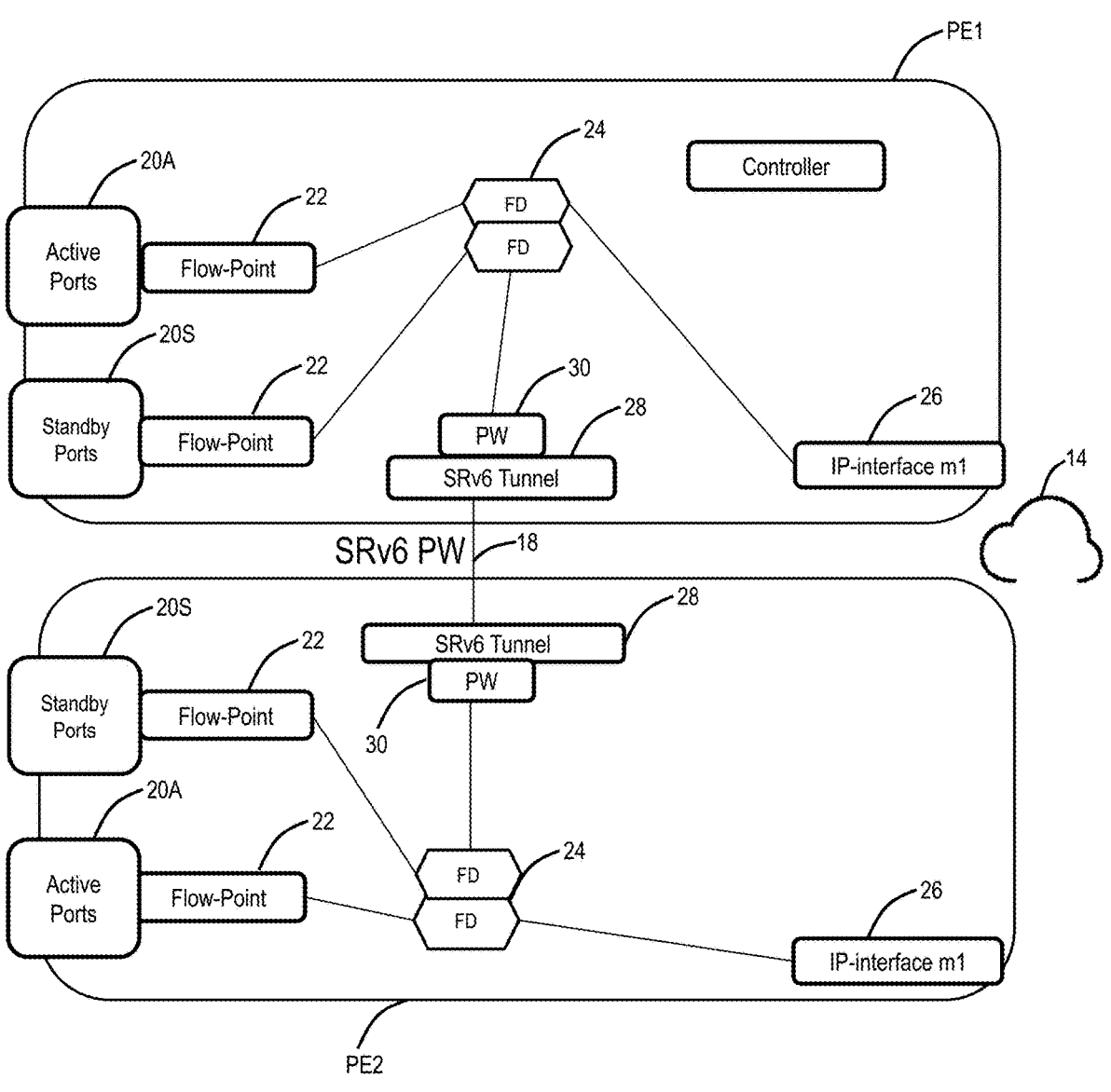
FIG. 2 is a block diagram of functionality in the PE routers PE1, PE2 for the dual homed configuration with the static connection.

Again, the present disclosure relates to systems and methods for simple fast Convergence using static pseudowire in a dual homing configuration. Additionally, the present disclosure includes an internal data center network architecture utilizing a Passive Optical Network (PON) architecture.

EVPN Multi-Homing Limited to Two PEs

EVPN is designed to support complex multi-homing configurations. However, the vast majority of configurations are dual homed. In a multi-homing configuration, Customer Edge (CE) devices to two or more Provider Edge (PE) routers. A CE device can be a host, a router, a switch, a workload, etc. Multi-homing allows redundancy. Of note, multi-homing is complex from a control plane implementation. Specifically, to support multi-homing, there is a need for RT-1, RT-3, Split Horizon, mass withdrawal, and the like. That is, there are various messages in the control plane used to deal with failures and traffic steering in a multi-homing configuration. Of note, as is known in the art, multi-homing means a CE device is connected to two or more PEs. However, in practice, the vast majority of multi-homing configurations are dual homed, i.e., only two PEs.

The present disclosure limits the scope of EVPN to two PE routers attached to dual homed servers, workloads, etc., to support EVPN-Integrated Routing and Bridging (IRB) with redundant gateways. There is a static pseudowire configured between the two PE routers for redundancy, thereby limiting the scope to synchronize server/workload Internet Protocol (IP) and Media Access Control (MAC) bindings. That is, the static pseudowire is configured in a redundancy group that limits the control plane scope for a dual homed configuration, such that using EVPN-IRB there is no RT-1, no RT-3, no Split Horizon, no mass withdrawal, etc., limiting the EVPN complexity. The static pseudowire can be a Segment Routing over Internet Protocol version 6 (SRv6 PW) and the protection group for the service can be inferred from the RT-2 information, which greatly simplifies both the control plane and the data plane. There is no need for additional protocols for active/standby (A/S) gateway selection (e.g., Virtual Router Redundancy Protocol (VRRP)/Hot Standby Router Protocol (HSRP), etc.), again simplifying the implementation. The standby ports can remain up with the approach described herein.

Dual Homed Configuration

FIG. 1 is a network diagram of a network 10 illustrating servers, workloads, tenant Virtual Machines (VMs), collectively CE devices 12, each dual homed to two PE routers PE1, PE2 that connect to a network 14, i.e., the cloud, Internet, etc. Of note, this is a typical configuration in a data center, i.e., in an internal data center network. For ease of description, the term "devices" is used to denote any of servers, workloads, tenant VMs, and the like, for the CE devices 12.

The two PE routers PE1, PE2 can have multiple CE devices 12 connected thereto. Each CE device 12 can be dual homed 16 to the PE routers PE1, PE2, i.e., connected to each of the PE routers PE1, PE2. For example, dual homing can be an Active/Standby (A/S) configuration where one connection is active and the other is standby.

Dual homing is used for resiliency, redundancy, load balancing, etc. For example, in the data center application, each PE router PE1, PE2 can have about half active ports and half standby ports.

There is a need for a connection 18 between the two PE routers PE1, PE2 to support connectivity therebetween. In the Active/Standby configuration, this connection 18 is used to communicate between the PE routers PE1, PE2, such as when a router's active port wants to communicate with another device on the same router that is connected to that router on a standby port. In this design, we are using the connection 18, such as a static PW, for two reasons. First, it simplifies the design and the second reason is to shunt traffic between two routes during convergence (BGP and IPv6 Neighbor Discovery) so there are no packet drops. This works in conjunction with the protection groups. Without the combination Service Protection Groups and the PW, there can be (depending on the scale) several seconds of traffic drops. This proposed redundancy mechanism minimizes traffic loss from several 100 milliseconds to almost sub 10 milliseconds. This is possible because we keep both IP interfaces (associated with Active and standby port) operational and point to service protection group instead of FPs. We also preprogram/sync using EVPN ARP/IPv6 Neighbor entries so there are no traffic drops due to missing Neighbor Discover.

For the connection 18, the present disclosure includes a pseudowire (PW) or IP tunnel between the routers, for a dual homing configuration. For example, the PW can be a SRv6 PW. Both pseudowires and IP tunnels are virtual constructs and avoid the need to dedicate a physical port between the PE routers PE1, PE2. For illustration purposes, the connection 18 is described herein as a static PW, but those skilled in the art will recognize this can be an IP tunnel or other type of connection between the PE routers PE1, PE2. In particular, the flow through the connection 18 is described as follows and the reduction in control plane functionality is achieved based on the static nature of the connection 18 and based on protection functionality implemented in circuitry, as opposed to control plane messages.

Of note, the connection 18 is described as a static pseudowire with SRv6 as typically most data centers only run IPv6. Those skilled in the art will appreciate the connection 19 can use other mechanisms, e.g., SR-MPLS for transport of the static PW, Label Distribution Protocol (LDP), Resource Reservation Protocol-Traffic Engineering (RSVP-TE), or the like.

Router Architecture

FIG. 2 is a block diagram of functionality in the PE routers PE1, PE2 for the dual homed configuration with the static connection 18. FIG. 2 is a functional diagram with the various components realized in circuitry, optics, etc. Each PE router PE1, PE2 has a set of active ports 20A and standby ports 20S, each connected to a flow point 22, which in turn connects to a forwarding domain (FD) 24. See MEF 12.2, Carrier Ethernet Network Architecture, Framework Part 2: Ethernet Services Layer, May 2014, and ITU-T Recommendation G.809 (03/03), "Functional architecture of connectionless layer networks," the contents of each are incorporated by reference, for description of the FD, flow point, etc. Specifically, a flow point is a "reference point" that represents a point of transfer for traffic units between topological components. A forwarding domain is a topological component used to effect forwarding of a specific characteristic information. Additionally, the active ports 20A and standby ports 20S connect to the CE devices 12 (not shown in FIG. 2). For example, some of the CE devices 12 can connect to the active ports 20A of the PE router PE1 and to the standby ports 20S of the PE router PE2, and a remainder of the CE devices 12 can connect to the active ports 20A of the PE router PE2 and to the standby ports 20S of the PE router PE1. That is, a given CE device 12 connects to an active port 20A on one of the PE routers and a standby port 20S on the other PE router.

The forwarding domain 24 also connects to an IP interface 26 on each PE router PE1, PE2. In this example, the connection 18 is configured as a static SRv6 PW where the PE routers PE1, PE2 include an SRv6 tunnel 28 and PW circuitry 30, which in turn connects to the forwarding domain 24. Again, all of these components 20, 22, 24, 26, 28, 30 are circuitry. In some implementations, these components 20, 22, 24, 26, 28, 30 can be realized in a switching circuit, Application Specific Integrated Circuit (ASIC), Field Programmable Gate Array (FPGA), etc.

Figure 3:
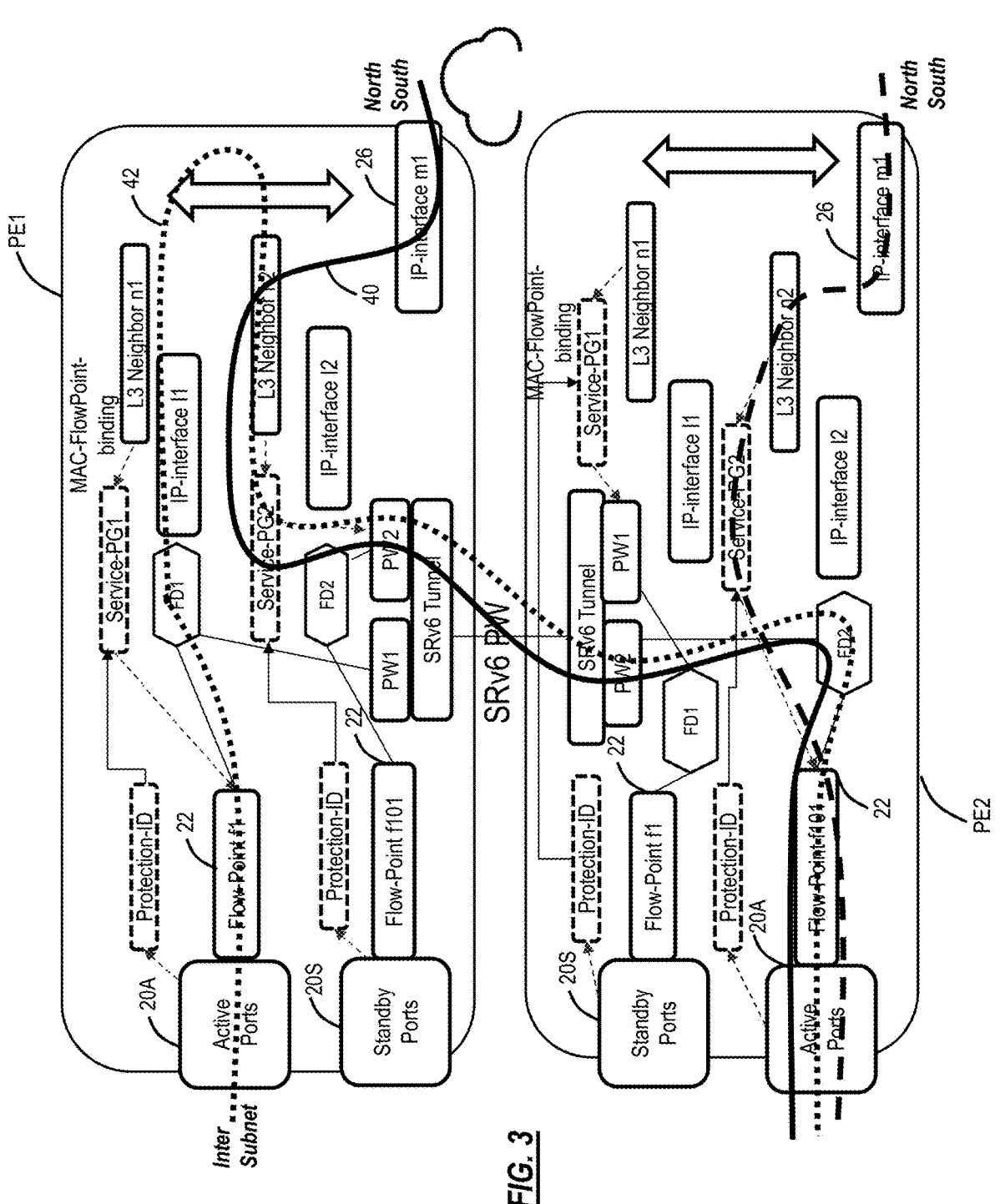
FIG. 3 is a block diagram of additional detail for the functionality in the PE routers PE1, PE2 for the dual homed configuration with the static connection.

FIG. 3 is a block diagram of additional detail for the functionality in the PE routers PE1, PE2 for the dual homed configuration with the static connection 18. In each of the PE routers PE1, PE2, there are flow points f1, f101 which connect to forwarding domains FD1, FD2. The active ports 20A on the PE router PE1 connect to the flow point f1 and the forwarding domain FD1 as do the standby ports 20S on the PE router PE2. The active ports 20A on the PE router PE2 connect to the flow point f101 and the forwarding domain FD2 as do the standby points 20S on the PE router PE1. There are two connections 18, namely PW1, PW2. The PW1 connects the forwarding domain FD1 in the PE router PE1 to the forwarding domain FD1 in the PE router PE2, and the PW2 connects the forwarding domain FD2 in the PE router PE1 to the forwarding domain FD2 in the PE router PE2.

For an interface to the PE routers PE1, PE2, i.e., either an active or standby port 20A, 20S or the IP interface 26, the PE routers PE1, PE2 include a protection construct that will direct packets destined to that interface over the pseudowire PW1, PW2 if the interface is not active. In the present disclosure, both interfaces will be active and can receive traffic from the network 14, it is the ports 20A, 20S which will be in active and standby state. The connections PW1, PW2 can be a static SRv6 PW (i.e., a Layer 2 (L2) tunnel), and there is one connection PW1, PW2 per forwarding domain FD1, FD2. Packets destined downstream via a port, will be switched on the PW after encaping the flow point f1, f101 Virtual Local Area Network (VLAN) if the port is not active. When the packet arrives on the active via the PW, packets will be cross connected to the corresponding flow point f1, f101 with matching VLAN. For example, in FIG. 3, there is traffic 40 that is destined for a CE device 12 connected to the active ports 20A on the PE router PE2 but which is received on the IP interface 26 on the PE router PE1. The PE routers PE1, PE2 include protection ID and service protection groups (PG) that are used to configure the routing between the forwarding domains, the flow points, and the PW1, PW2. Because the CE device for the traffic 40 is connected to the standby ports 20S on the PE router PE1, the service PG2 is configured to send the traffic 40 via the PW2 to the PE router PE2.

EVPN RT-2 mechanisms can be used to distribute the CE devices IP/MAC bindings between the routers. The IP/MAC bindings associated with one port, will point to a service protection group (PG) that will deliver the packet out the port if active or send it over the static PW otherwise. In this manner, all that is needed is a correct designation for the active and standby ports to configure whether traffic is deliver to the active ports or to the static PW. That is, the EVPN IRB (RT-2) synchronizes IP to MAC & MAC to FP/VLAN Bindings from Active to Standby.

On Standby, IP/MAC binding will be programmed on the L3 interface, and the MAC will be programmed in the forwarding domain pointing to the Service PG, having the flow point associated with the VLAN and the PW.

In an embodiment, EVPN RT-4 can be used to communicate which port is active and can determine which port is active. Once a port is activated on standby after failover on receipt of RT-4, packets switched over the PW will be switched via the port instead. In another embodiment, the service protection group state can be controlled by the status of the ports 20A, 20S instead of using RT-4.

Intra-subnet traffic is switched within the forwarding domains FD1, FD2 via different FPs. Intra-Subnet traffic between CE devices (e.g., servers/workloads) will be L2 switched, to another VLAN/flow point on the same or different port. If the other port, is not active, then the packets will be switched to the other PE router via the PW and then L2 switched on the other PE router.

Inter-subnet traffic be switched locally or via the PW if the other port is standby. Inter-subnet traffic between CE devices (e.g., servers/workloads) will be L3 switched, to another port if the other port is active, or via the PW and then L2 switched on the other router. For example, traffic 42 is an example of inter-subnet traffic that is sent over the PW. The traffic will be switched locally if ports associated with outgoing interfaces are active on the router, or, in standby, then traffic will still be delivered to the IP interface on the local router but it will be switched to the other PE router via the connection 18 where the port is in active state.

There is no MAC learning over the PW1, PW2. The PE router PE1, PE2 with the active port advertises the IP subnet with no Autonomous System (AS) path prepend, and the PE router PE1, PE2 with the standby port advertises the subnet with AS path prepend. North and south L3 traffic landing on the PE router PE1, PE2 with the active port direct traffic to the port. Landing on the PE router PE1, PE2 with the standby port, the traffic is sent over the PW to the other router to be L2 switched to the active port. AS prepend is one way to do it assuming it is an eBGP peer. There are other mechanisms available based on the standard BGP implementation which can be used for eBGP and iBGP sessions. For example, for iBGP we can use LOCAL_PREFERENCE.

Advantageously, the use of a static SRv6 PW, and inferred service PG from the port status greatly simplifies the control and data plane implementation. This eliminates the need for additional protocols for Active/Standby (A/S) Gateway GW selection (Virtual Router Redundancy Protocol (VRRP)/Hot Standby Router Protocol (HSRP), etc.) thereby simplifying the access topology by not carrying protocol messages like VRRP.

The standby port can remain up with this solution, but not in the forwarding state. We can have one PW per Forwarding domain (FD), or for all FDs on the port with an FD identification encapsulated on the PW. Note, the terminology PG, FD, etc. are associated with a switching circuit that supports programmability. The protection mechanism makes router to server connectivity technology agnostic like PON.

Advantageously, the approach described herein utilizes the data plane only for switch over, no control plane. Thus, convergence is fast and simple.

Also, as described herein, the connection 18 and the term connect means any of a physical connection, a logical connection, a connection with intermediate ports or devices, as well as combinations thereof. Specifically, something that is connected or the connection 18 itself refers to a link providing data traffic therebetween, e.g., packets. That is, connect is used as is known in the art in networking.

PON Network Architecture

In an embodiment, the present disclosure includes adaptation of the PON network architecture to an internal data center network. For example, the active and standby ports in the routers can be pluggable OLT (Optical Line Terminal) module, such as a uOLT available from Ciena Corporation.

The PON architecture includes a plurality of Optical Network Units (ONU) that all connect to the OLT. In a typical deployment, the ONUs are located in the field, at subscriber locations, e.g., homes. The present disclosure contemplates using the OLT pluggable module in the routers that connects to ONUs which can be the devices, i.e., servers, workloads, etc. That is, the PON architecture is used internally in the data center network.

The following FIGS. describe an embodiment using OLT modules and the PON network architecture between the PE routers PE1, PE2 and the dual homed CE devices, for illustration purposes. Those skilled in the art will recognize the static PW can be used with this approach, as well as with the active/standby ports 20A, 20S utilizing other technologies.

Intra Subnet Traffic (L2 Switched)

Figure 4:
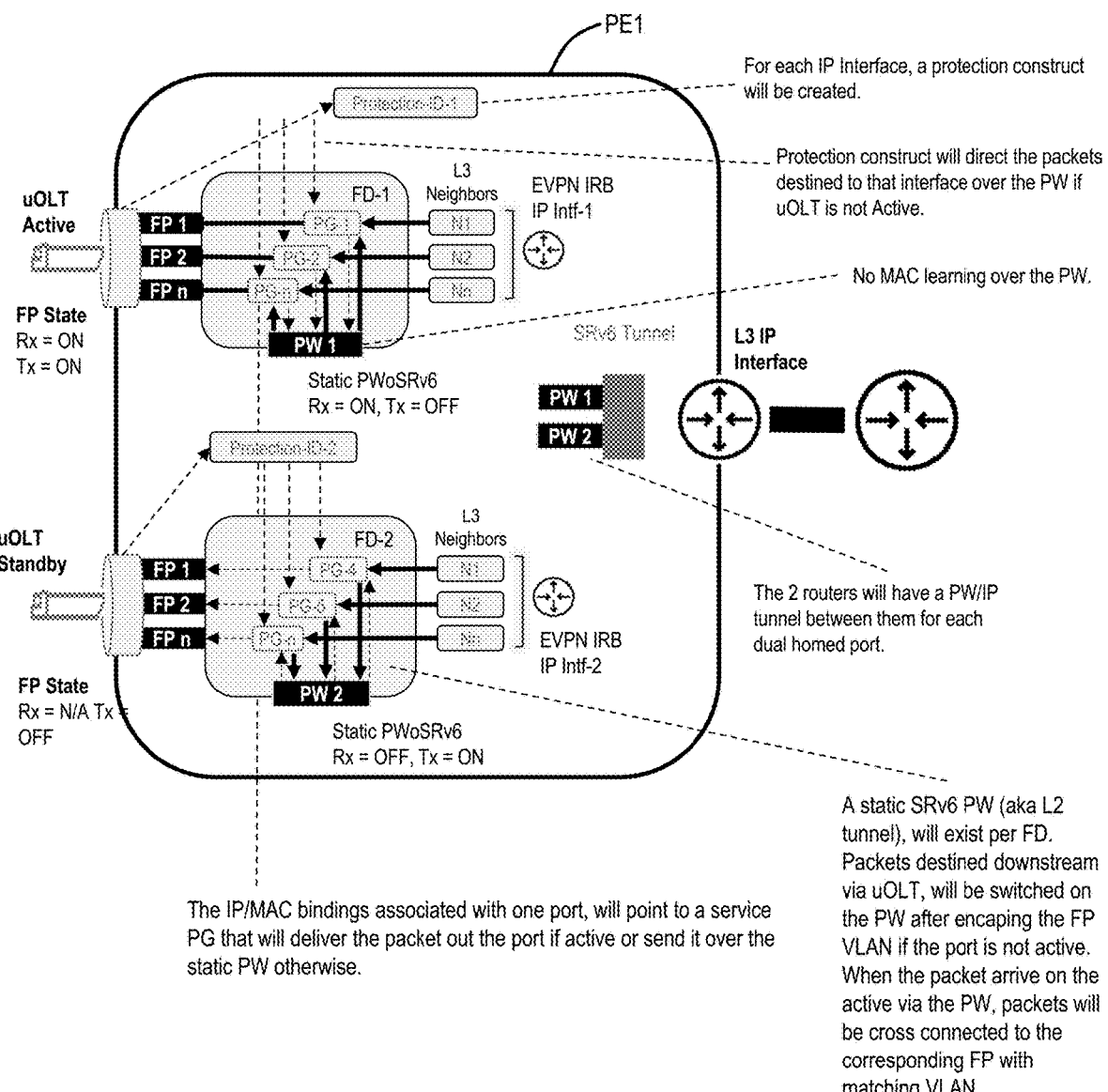
FIG. 4 is a diagram of the PE router PE1 for illustrating the management with Integrated Routing and Bridging (IRB).
Figure 5:
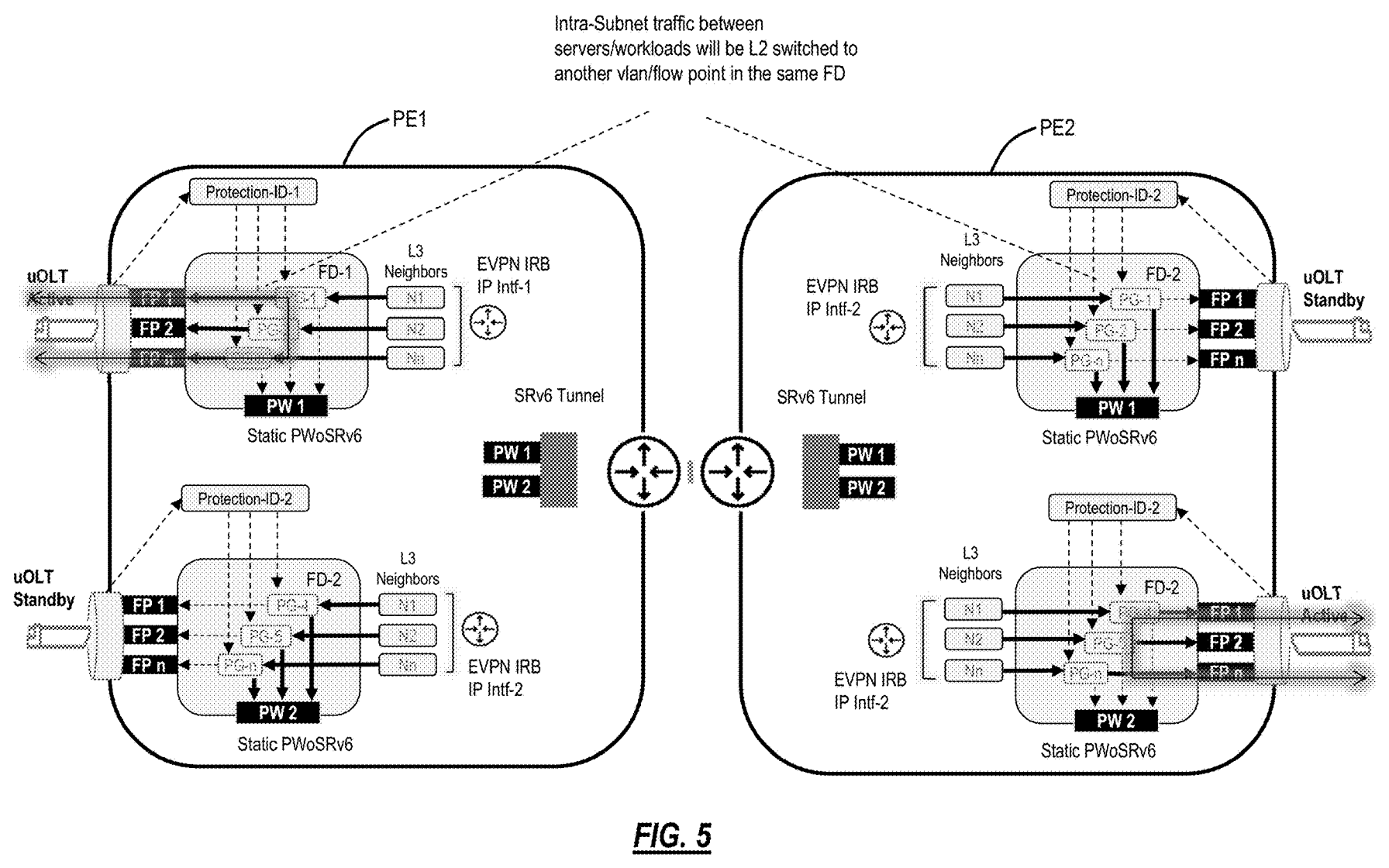
Figure 6:
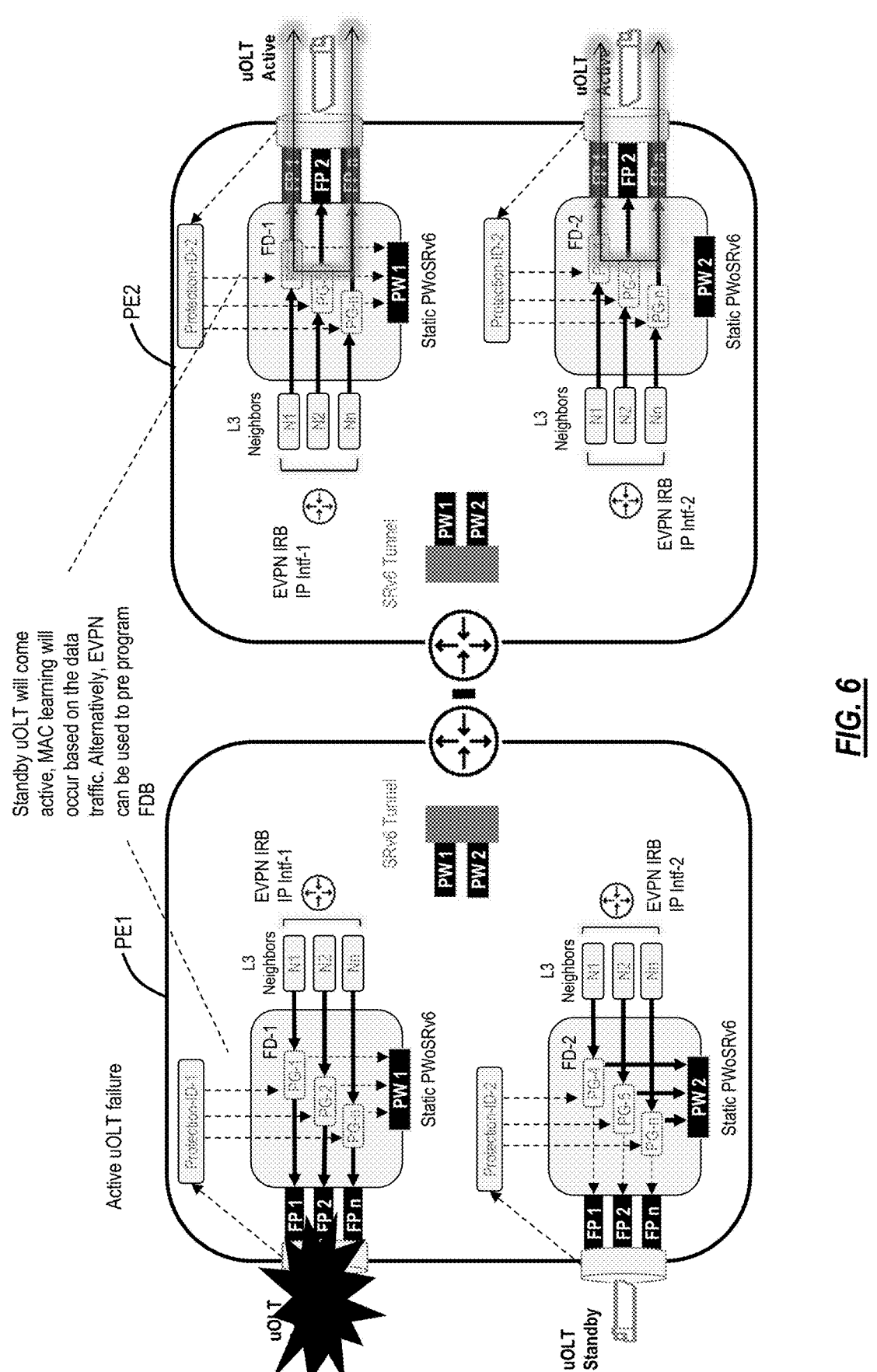
FIG. 6 is a network diagram of the network illustrating intra subnet traffic switched at Layer 2, with a failure on the active ports of the PE router PE1.

FIG. 4 is a diagram of the PE router PE1 for illustrating the management with Integrated Routing and Bridging (IRB). FIG. 5 is a network diagram of the network 10 illustrating intra subnet traffic switched at Layer 2. FIG. 6 is a network diagram of the network 10 illustrating intra subnet traffic switched at Layer 2, with a failure on the active ports of the PE router PE1.

IRB Solution EVPN Control Plane

Figure 7:
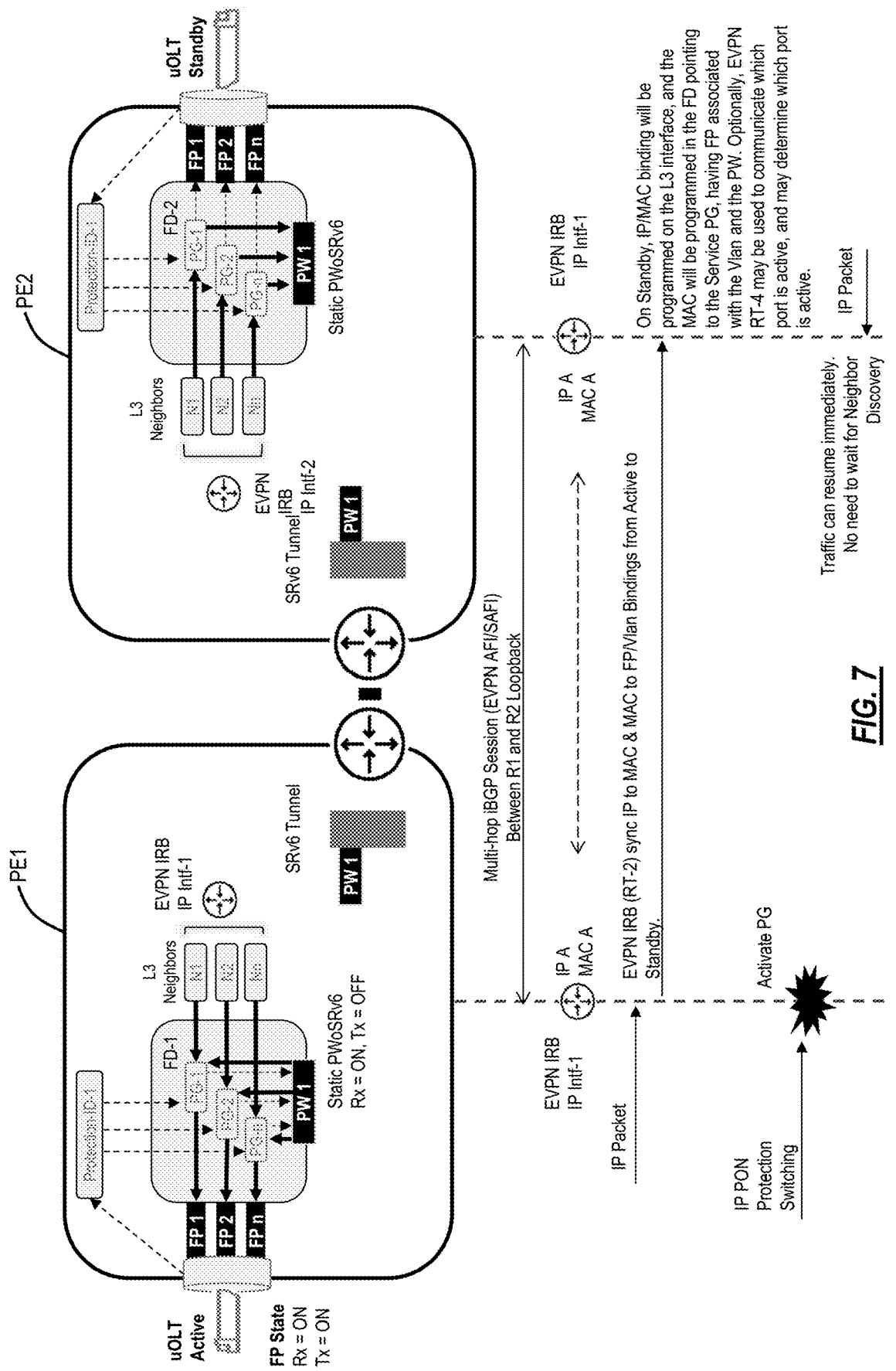
FIG. 7 is a network diagram of the network illustrating an IRB solution for the EVPN control plane.

FIG. 7 is a network diagram of the network 10 illustrating an IRB solution for the EVPN control plane. There is a Border Gateway Protocol (BGP) session between the PE routers PE1, PE2, e.g., an interior BGP (iBGP), exchanging EVPN, Address Family Indicator (AFI), and Subsequent AFI (SAFI) information.

IRB Solution Routing Control Plane

Figure 8:
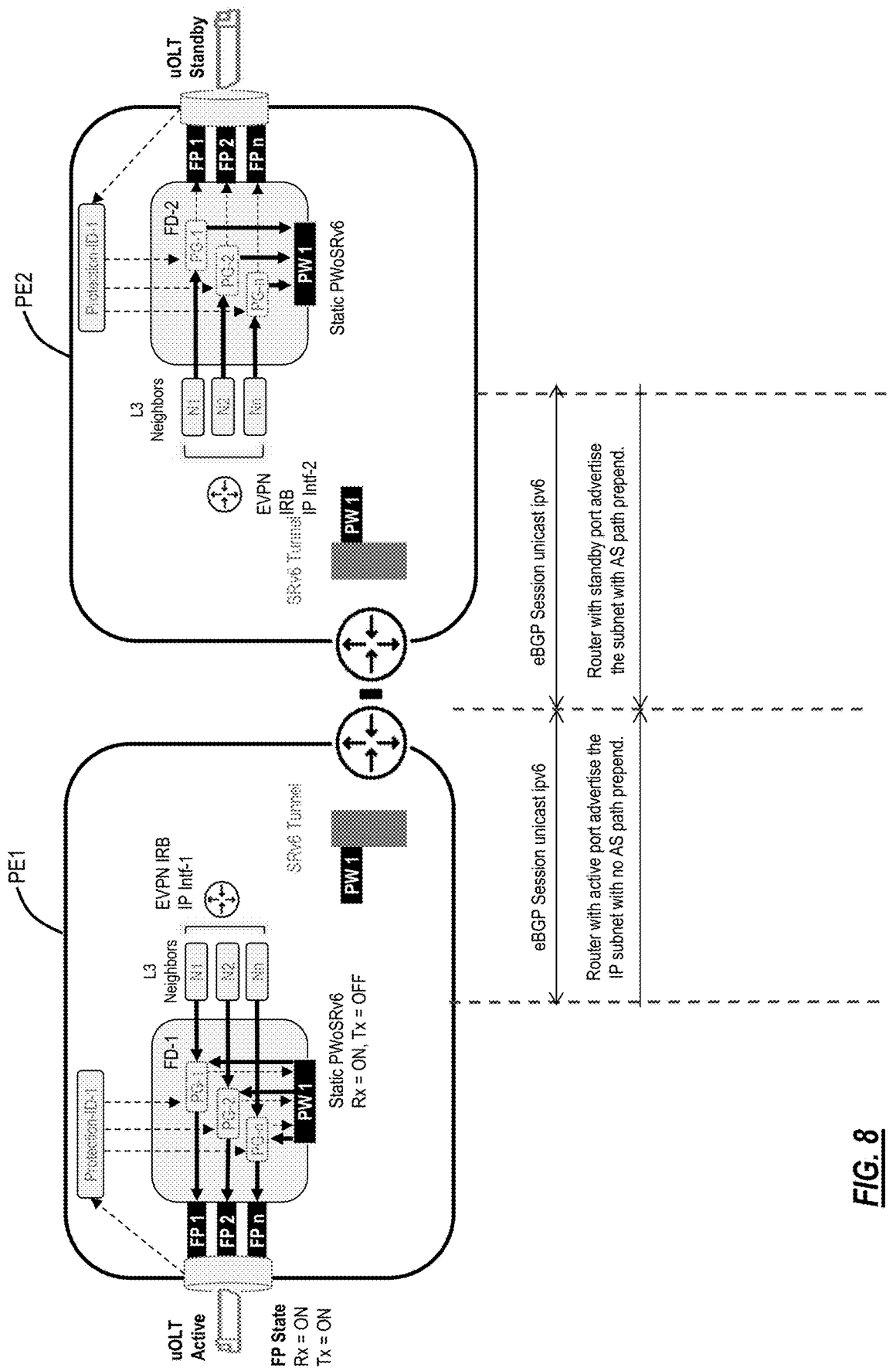
FIG. 8 is a network diagram of the network illustrating an IRB solution for routing.

FIG. 8 is a network diagram of the network 10 illustrating an IRB solution for routing. There is an exterior BGP (eBGP) session between the IP interfaces 26 and the network 14.

Figure 9:
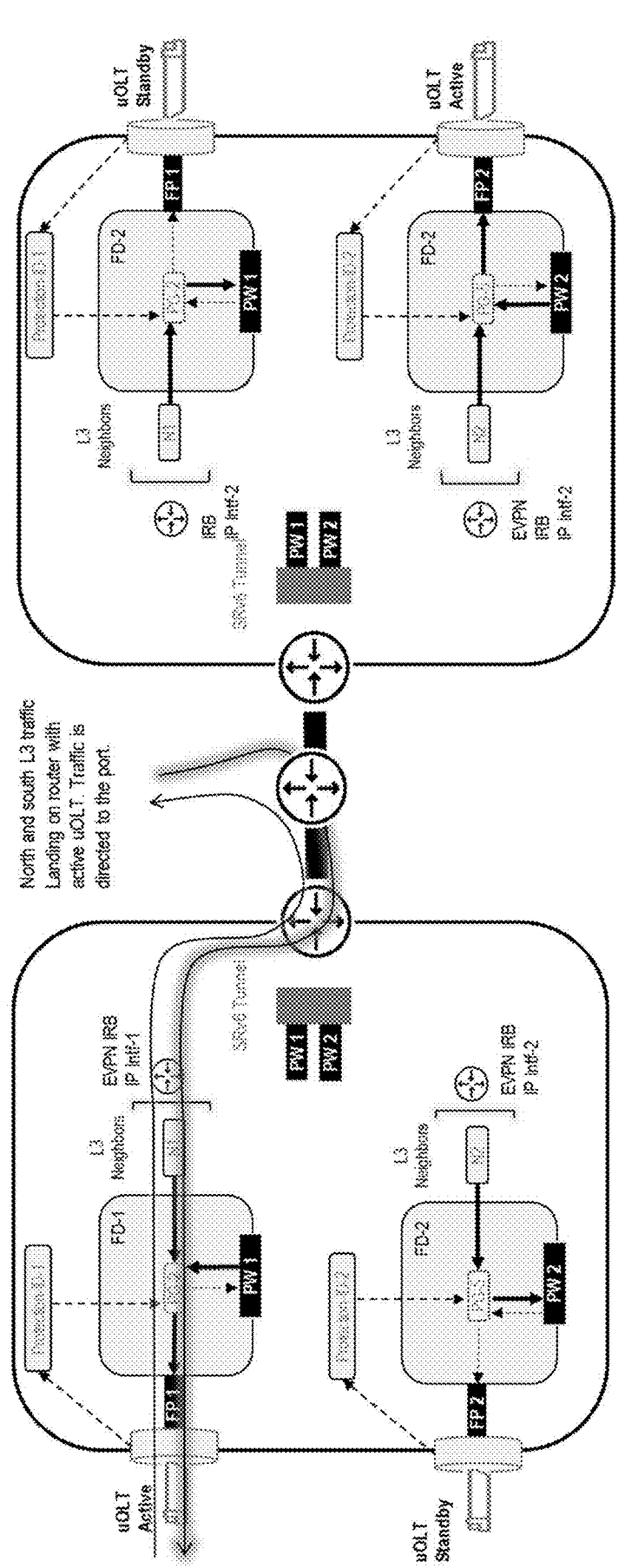
FIG. 9 is a network diagram of the network illustrating north/south L3 traffic landing on the PE router PE1 with the active port.

FIG. 9 is a network diagram of the network 10 illustrating north/south L3 traffic landing on the PE router PE1 with the active port.

Figure 10:
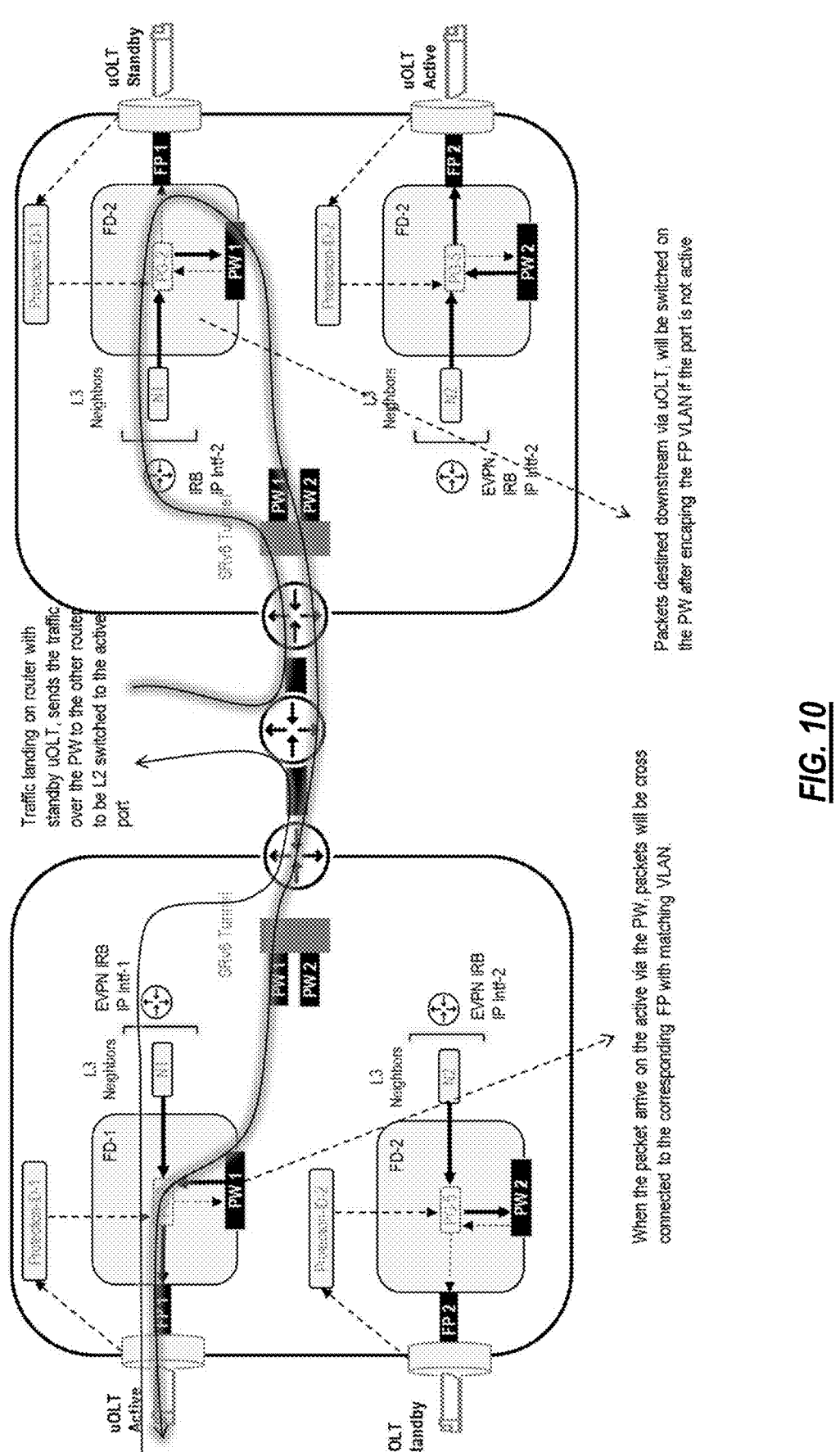
FIG. 10 is a network diagram of the network illustrating north/south L3 traffic landing on the PE router PE2 with the standby port.

FIG. 10 is a network diagram of the network 10 illustrating north/south L3 traffic landing on the PE router PE2 with the standby port.

Figure 11:
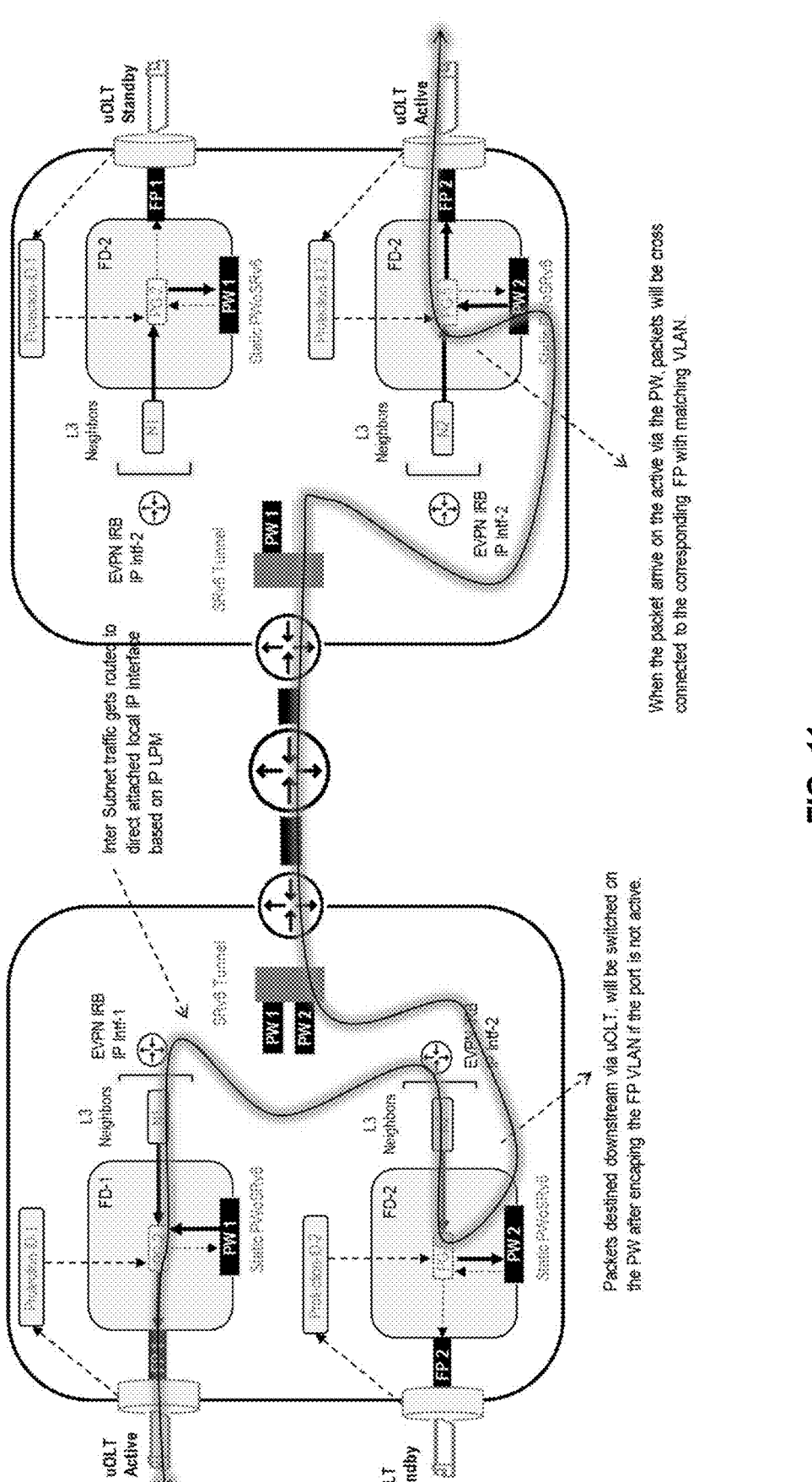
FIG. 11 is a network diagram of the network illustrating inter subnet traffic.

FIG. 11 is a network diagram of the network 10 illustrating inter subnet traffic.

PE Router

In an embodiment, a Provider Edge (PE) router includes a plurality of ports configured to connect to one or more Customer Edge (CE) devices, wherein the plurality of ports are in an Ethernet Virtual Private Network (EVPN) with a second PE router having a second plurality of ports; a static connection configured to connect to the second plurality of ports in the second PE router; and switching circuitry connected to and configured to switch traffic between the plurality of ports, the static connection, and an Internet Protocol (IP) interface connected to an external network, wherein the EVPN is confined to dual homing and protection functionality in the dual homing is performed based on settings in the switching circuitry.

The static connection can be a pseudowire, such as a Segment Routing over Internet Protocol version 6 pseudowire. The settings in the switching circuitry can be settings of a protection group that can be set based on EVPN Route Type 2 information, port forwarding state, or whether the port is active or standby. The EVPN can utilize Integrated Routing and Bridging (IRB) and does not utilize EVPN Route Type 1 or Route Type 3 information. The protection functionality in the dual homing is performed in a data plane.

The plurality of ports can include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and a standby port of another of the PE router and the second PE router. Traffic on the IP interface destined for an active port of the plurality of ports is directed to the active port, and traffic on the IP interface destined for a standby port of the plurality of ports is directed to the second PE router via the static connection. The switching circuitry can be configured to determine there is a fault, and to adjust a configuration based thereon.

In another embodiment, a PE router includes one or more active ports configured to connect to a first set of Customer Edge (CE) devices; one or more standby ports configured to connect to a second set of CE devices, wherein the one or more active ports and the one or more standby ports are in an Ethernet Virtual Private Network (EVPN) with a second PE router having one or more second active ports and one or more second standby ports, wherein the EVPN is confined to dual homing; a first static connection between the one or more active ports and the one or more second standby ports; a second static connection between the one or more standby ports and the one or more second active ports; and switching circuitry connected to and configured to switch traffic between the one or more active ports, the one or more standby ports, the first static connection, the second static connection, and an Internet Protocol (IP) interface connected to an external network.

Process

Figure 12:
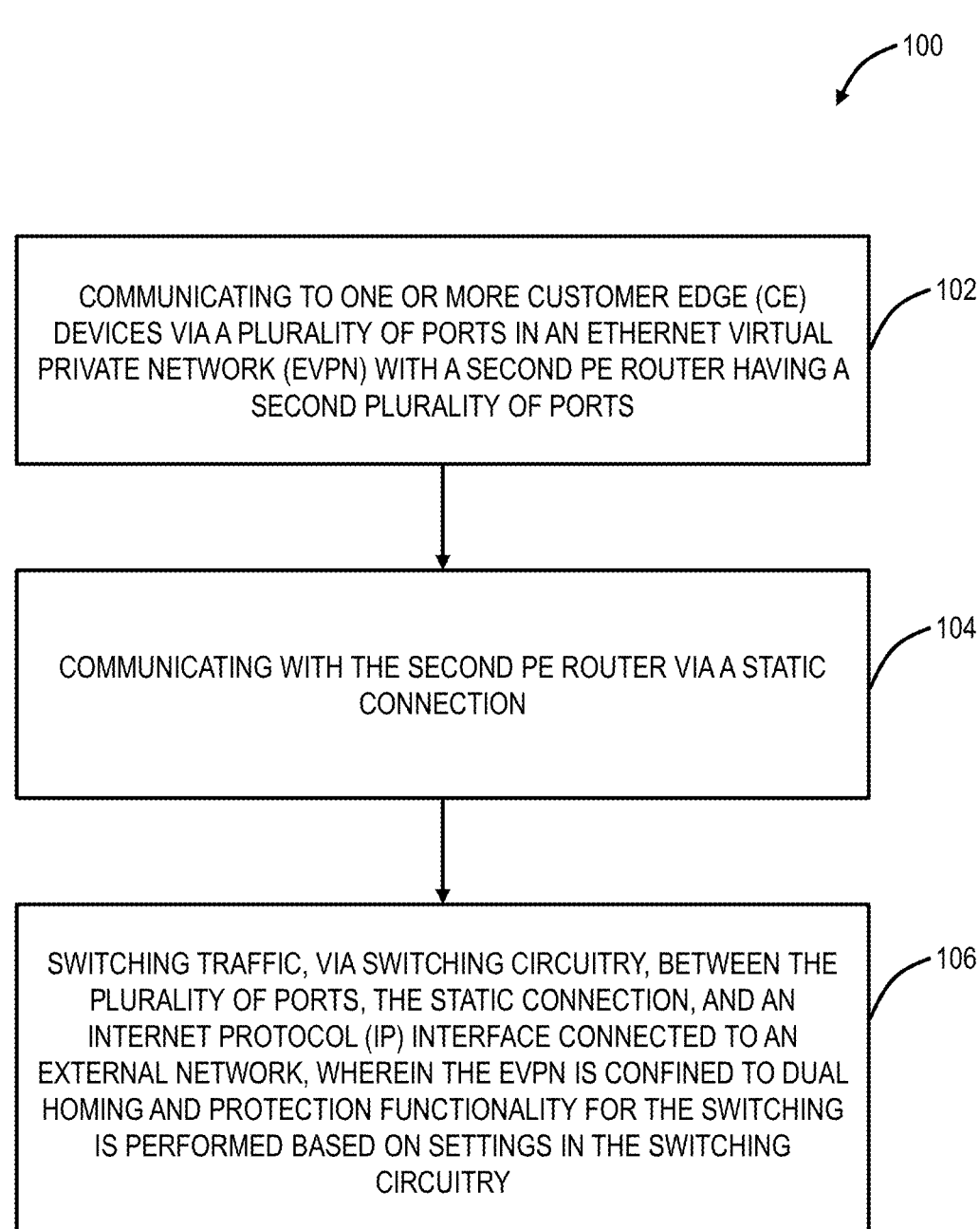
FIG. 12 is a flowchart of a process, implemented by a PE router.

FIG. 12 is a flowchart of a process 100, implemented by a PE router. The process 100 includes communicating to one or more Customer Edge (CE) devices via a plurality of ports in an Ethernet Virtual Private Network (EVPN) with a second PE router having a second plurality of ports (step 102); communicating with the second PE router via a static connection (step 104); and switching traffic, via switching circuitry, between the plurality of ports, the static connection, and an Internet Protocol (IP) interface connected to an external network, wherein the EVPN is confined to dual homing and protection functionality for the switching is performed based on settings in the switching circuitry (step 106).

The static connection can be a pseudowire, such as a Segment Routing over Internet Protocol version 6 pseudowire. The settings in the switching circuitry can be settings of a protection group that are set based on EVPN Route Type 2 information, port forwarding state, or whether the port is active or standby. The EVPN can utilize Integrated Routing and Bridging (IRB) and does not utilize EVPN Route Type 1 or Route Type 3 information. The protection functionality in the dual homing is performed in a data plane.

The plurality of ports can include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and a standby port of another of the PE router and the second PE router. Traffic on the IP interface destined for an active port of the plurality of ports is directed to the active port, and traffic on the IP interface destined for a standby port of the plurality of ports is directed to the second PE router via the static connection. The switching circuitry can be configured to determine there is a fault, and to adjust a configuration based thereon.

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A Provider Edge (PE) router comprising:

a plurality of ports configured to connect to one or more Customer Edge (CE) devices, wherein the plurality of ports are in an Ethernet Virtual Private Network (EVPN) with a second PE router having a second plurality of ports;

a static connection which is a pseudowire configured to connect to the second plurality of ports in the second PE router, wherein the static connection is pre-config-ured independent of a control plane, configured to remain continuously active without keepalive exchanges, and dedicated to providing protection switching between the PE router and the second PE router in a dual homing configuration; and switching circuitry connected to and configured to switch traffic between the plurality of ports, the static connec-tion, and an Internet Protocol (IP) interface, wherein the EVPN is confined to dual homing and pro-tection functionality in the dual homing is performed in a data plane based on predetermined settings in the switching circuitry without involvement of the control plane.

2. The PE router of claim 1, wherein the static connection is a Segment Routing over Internet Protocol version 6 pseudowire.

3. The PE router of claim 1, wherein the settings in the switching circuitry are settings of a protection group that are set based on a respective port status whether it is active or standby.

4. The PE router of claim 1, wherein the EVPN utilizes Integrated Routing and Bridging (IRB) and does not utilize EVPN Route Type 1 or Route Type 3 information.

5. The PE router of claim 1, wherein the plurality of ports include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and to a standby port of another of the PE router and the second PE router.

6. The PE router of claim 1, wherein traffic on the IP interface destined for an active port of the plurality of ports is directed to the active port, and traffic on the IP interface destined for a standby port of the plurality of ports is directed to the second PE router via the static connection.

7. The PE router of claim 1, wherein the switching circuitry is configured to determine there is a fault, and to adjust a configuration based thereon.

8. A method, implemented by a Provider Edge (PE) router, comprising steps of:

communicating to one or more Customer Edge (CE) devices via a plurality of ports in an Ethernet Virtual Private Network (EVPN) with a second PE router having a second plurality of ports;

communicating with the second PE router via a static connection which is a pseudowire, wherein the static connection is pre-configured independent of a control plane, configured to remain continuously active with-out keepalive exchanges, and dedicated to providing protection switching between the PE router and second PE router in a dual homing configuration; and switching traffic, via switching circuitry, between the plurality of ports, the static connection, and an Internet Protocol (IP) interface, wherein the EVPN is confined to dual homing and protection functionality for the switching is performed in a data plane based on pre-determined settings in the switching circuitry without involvement of the control plane.

9. The method of claim 8, wherein the static connection is a Segment Routing over Internet Protocol version 6 pseudowire.

10. The method of claim 8, wherein the settings in the switching circuitry are settings of a protection group that are set based on a respective port status whether it is active or standby.

11. The method of claim 8, wherein the EVPN utilizes Integrated Routing and Bridging (IRB) and does not utilize EVPN Route Type 1 or Route Type 3 information.

12. The method of claim 8, wherein the plurality of ports include a set of active ports and a set of standby ports, wherein the second plurality of ports in second PE router includes a second set of active ports and a second set of standby ports, and wherein the one or more CE devices are a plurality of CE devices, each CE device connected to an active port on one of the PE router and the second PE router and to a standby port of another of the PE router and the second PE router.

13. The method of claim 8, wherein traffic on the IP interface destined for an active port of the plurality of ports is directed to the active port, and traffic on the IP interface destined for a standby port of the plurality of ports is directed to the second PE router via the static connection.

14. A Provider Edge (PE) router comprising:

one or more active ports configured to connect to a first set of Customer Edge (CE) devices;

one or more standby ports configured to connect to a second set of CE devices, wherein the one or more active ports and the one or more standby ports are in an Ethernet Virtual Private Network (EVPN) with a sec-ond PE router having one or more second active ports and one or more second standby ports, wherein the EVPN is confined to dual homing;

a first static connection which is a pseudowire between the one or more active ports and the one or more second standby ports;

a second static connection which is another pseudowire a between the one or more standby ports and the one or more second active ports, wherein the first and second static connections are pre-configured independent of a control plane, configured to remain continuously active without keepalive exchanges, and dedicated to provid-ing protection switching between the PE router and the second PE router in a dual homing configuration; and switching circuitry connected to and configured to switch traffic between the one or more active ports, the one or more standby ports, the first static connection, the second static connection, and an Internet Protocol (IP) interface, such that protection functionality is per-formed in a data plane based on predetermined settings in the switching circuitry without involvement of the control plane.

15. The PE router of claim 14, wherein the first static connection and the second static connection are each a pseudowire.

16. The PE router of claim 14, wherein the settings in the switching circuitry are settings of a protection group that are set based on port status whether it is active or standby.

* * * * *